United States Patent
Hsia

(10) Patent No.: US 10,021,753 B2
(45) Date of Patent: Jul. 10, 2018

(54) LINEAR SOLID-STATE LIGHTING WITH FRONT END ELECTRIC SHOCK DETECTION

(71) Applicant: Aleddra Inc., Renton, WA (US)

(72) Inventor: Chungho Hsia, Bellevue, WA (US)

(73) Assignee: ALEDDRA INC., Renton, WA (US)

( * ) Notice: Subject to any disclaimer, the term of this patent is extended or adjusted under 35 U.S.C. 154(b) by 0 days.

(21) Appl. No.: 15/836,170

(22) Filed: Dec. 8, 2017

(65) Prior Publication Data
US 2018/0103524 A1    Apr. 12, 2018

Related U.S. Application Data

(63) Continuation-in-part of application No. 15/649,392, filed on Jul. 13, 2017, which is a continuation-in-part of application No. 15/444,536, filed on Feb. 28, 2017, now Pat. No. 9,826,595, which is a continuation-in-part of application No. 15/362,772, filed on Nov. 28, 2016, now Pat. No. 9,967,927, which is a continuation-in-part of application No. 15/225,748, filed on Aug. 1, 2016, now Pat. No. 9,743,484, which is a continuation-in-part of application No. 14/818,041, filed on Aug. 4, 2015, now Pat. No. 9,420,663, which is a continuation-in-part of application No. 14/688,841, filed on Apr. 16, 2015, now Pat. No. 9,288,867, which is a continuation-in-part of application No. 14/465,174, filed on Aug. 21, 2014, now Pat. No. 9,277,603, which is a continuation-in-part of
(Continued)

(51) Int. Cl.
*H05B 33/08* (2006.01)
*F21K 9/27* (2016.01)

(52) U.S. Cl.
CPC .......... *H05B 33/0887* (2013.01); *F21K 9/27* (2016.08); *H05B 33/0815* (2013.01)

(58) Field of Classification Search
None
See application file for complete search history.

(56) References Cited

U.S. PATENT DOCUMENTS

| 9,686,835 B2 * | 6/2017 | Park | H05B 33/089 |
| 2012/0032610 A1 * | 2/2012 | Kang | H02M 3/156 |
| | | | 315/297 |

(Continued)

*Primary Examiner* — Douglas W Owens
*Assistant Examiner* — James H Cho
(74) *Attorney, Agent, or Firm* — Han IP Corporation; Andy M. Han

(57) ABSTRACT

A linear light-emitting diode (LED)-based solid-state lamp comprises a front-end electric shock detection and control module, an LED driving circuit, and LED arrays. The front-end electric shock detection and control module comprises at least one full-wave rectifier, at least one half-wave rectifier, a constant current sink connected to the at least one half-wave rectifier, a signal extraction unit, a switch control unit, and at least one switch. By sending probing pulses to the constant current sink and checking a detection signal in a mixed direct-current voltage from the at least one full-wave rectifier and the at least one half-wave rectifier in response to the probing pulses, the front-end electric shock detection and control module detects and determines if the linear LED-based solid-state lamp is operated in a normal mode or in an electric shock hazard mode.

18 Claims, 5 Drawing Sheets

Related U.S. Application Data application No. 14/135,116, filed on Dec. 19, 2013, now Pat. No. 9,163,818, which is a continuation-in-part of application No. 13/525,249, filed on Jun. 15, 2012, now Pat. No. 8,749,167.

(56) References Cited

U.S. PATENT DOCUMENTS

| | | | |
|---|---|---|---|
| 2014/0265900 A1* | 9/2014 | Sadwick | H05B 33/0803 315/200 R |
| 2016/0356473 A1* | 12/2016 | Van Delden | F21V 25/04 |

* cited by examiner (a)

(b)

LINEAR SOLID-STATE LIGHTING WITH FRONT END ELECTRIC SHOCK DETECTION

CROSS-REFERENCE TO RELATED APPLICATIONS

The present disclosure is part of a continuation-in-part (CIP) application of U.S. patent application Ser. No. 15/649,392, filed 13 Jul. 2017, which is a CIP application of U.S. patent application Ser. No. 15/444,536, filed 28 Feb. 2017 and issued as U.S. Pat. No. 9,826,595 on 21 Nov. 2017, which is a CIP application of U.S. patent application Ser. No. 15/362,772, filed 28 Nov. 2016, which is a CIP application of U.S. patent application Ser. No. 15/225,748, filed 1 Aug. 2016 and issued as U.S. Pat. No. 9,743,484 on 22 Aug. 2017, which is a CIP application of U.S. patent application Ser. No. 14/818,041, filed 4 Aug. 2015 and issued as U.S. Pat. No. 9,420,663 on 16 Aug. 2016, which is a CIP application of U.S. patent application Ser. No. 14/688,841, filed 16 Apr. 2015 and issued as U.S. Pat. No. 9,288,867 on 15 Mar. 2016, which is a CIP application of U.S. patent application Ser. No. 14/465,174, filed 21 Aug. 2014 and issued as U.S. Pat. No. 9,277,603 on 1 Mar. 2016, which is a CIP application of U.S. patent application Ser. No. 14/135,116, filed 19 Dec. 2013 and issued as U.S. Pat. No. 9,163,818 on 20 Oct. 2015, which is a CIP application of U.S. patent application Ser. No. 13/525,249, filed 15 Jun. 2012 and issued as U.S. Pat. No. 8,749,167 on 10 Jun. 2014. Contents of the above-identified applications are incorporated herein by reference in their entirety.

BACKGROUND

Technical Field

The present disclosure relates to linear light-emitting diode (LED) lamps and more particularly to a linear LED lamp with electric shock detection and prevention in front of an LED driving circuit and LED arrays, to shut off in advance an accidental LED current to reach earth ground through a person's body.

Description of the Related Art

Solid-state lighting from semiconductor light-emitting diodes (LEDs) has received much attention in general lighting applications today. Because of its potential for more energy savings, better environmental protection (no hazardous materials used), higher efficiency, smaller size, and much longer lifetime than conventional incandescent bulbs and fluorescent tubes, the LED-based solid-state lighting will be a mainstream for general lighting in the near future. As LED technologies develop with the drive for energy efficiency and clean technologies worldwide, more families and organizations will adopt LED lighting for their illumination applications. In this trend, the potential safety concerns such as risk of electric shock become especially important and need to be well addressed.

In today's retrofit application of a linear LED tube (LLT) lamp to replace an existing fluorescent tube, consumers may choose either to adopt a ballast-compatible LLT lamp with an existing ballast used to operate the fluorescent tube or to employ an AC mains-operable LED lamp by removing/bypassing the ballast. Either application has its advantages and disadvantages. In the former case, although the ballast consumes extra power, it is straightforward to replace the fluorescent tube without rewiring, which consumers may have a first impression that it is the best alternative to fluorescent tube lamps. But the fact is that total cost of ownership for this approach is high regardless of very low initial cost. For example, the ballast-compatible LLT lamps work only with particular types of ballasts. If the existing ballast is not compatible with the ballast-compatible LLT lamp, the consumers will have to replace the ballast. Some facilities built long time ago incorporate different types of fixtures, which requires extensive labor for both identifying ballasts and replacing incompatible ones. Moreover, a ballast-compatible LLT lamp can operate longer than the ballast. When an old ballast fails, a new ballast will be needed to replace in order to keep the ballast-compatible LLT lamps working. Maintenance will be complicated, sometimes for lamps and sometimes for ballasts. The incurred cost will preponderate over the initial cost savings by changeover to the ballast-compatible LLT lamps for hundreds of fixtures throughout a facility. When the ballast in a fixture dies, all the ballast-compatible tube lamps in the fixture go out until the ballast is replaced. In addition, replacing a failed ballast requires a certified electrician. The labor costs and long-term maintenance costs will be unacceptable to end users. From energy saving point of view, a ballast constantly draws power, even when the ballast-compatible LLT lamps are dead or not installed. In this sense, any energy saved while using the ballast-compatible LLT lamps becomes meaningless with the constant energy use by the ballast. In the long run, ballast-compatible LLT lamps are more expensive and less efficient than self-sustaining AC mains-operable LLT lamps.

On the contrary, an AC mains-operable LLT lamp does not require a ballast to operate. Before use of an AC mains-operable LLT lamp, the ballast in a fixture must be removed or bypassed. Removing or bypassing the ballast does not require an electrician and can be replaced by end users. Each AC mains-operable LLT lamp is self-sustaining. If one AC mains-operable tube lamp in a fixture goes out, other lamps in the fixture are not affected. Once installed, the AC mains-operable LLT lamps will only need to be replaced after 50,000 hours. In view of above advantages and disadvantages of both ballast-compatible LLT lamps and AC mains-operable LLT lamps, it seems that market needs a most cost-effective solution by using a universal LLT lamp that can be used with the AC mains and is compatible with an electronic ballast so that LLT lamp users can save an initial cost by changeover to such a universal LLT lamp followed by retrofitting the lamp fixture to be used with the AC mains when the ballast dies.

In the U.S. patent application Ser. No. 14/688,841, filed Apr. 16, 2015, two shock prevention switches and an all-in-one driving circuit are adopted in an LLT lamp such that AC power from either an electronic ballast or the AC mains can operate the lamp without operational uncertainty and electric shock hazards. In other words, no matter what a lamp fixture is configured as the AC mains or an electronic ballast compatible fashion, the LLT lamp automatically detects configurations and works for either one. All of such LLT lamps, no matter whether AC mains-operable or ballast compatible, are electrically wired as double-ended and have one construction issue related to product safety and needed to be resolved prior to wide field deployment. This kind of LLT lamps, if no shock prevention scheme is adopted in, always fails a safety test, which measures a through-lamp electric shock current. Because an AC-mains voltage applies to both opposite ends of the tube when connected to a power source, the measurement of current leakage from one end to the other consistently results in a substantial current flow, which may present a risk of an electric shock during re-lamping. Due to this potential shock risk to the person who replaces the LLT lamps in an existing fluorescent tube fixture, Underwriters Laboratories (UL) uses its safety standard, UL 935, Risk of Shock During Relamping (Through Lamp), to do a current leakage test and to determine if the LLT lamps meet the consumer safety requirement. Although the LLT lamps used with an electronic ballast can pass the current leakage test, some kinds of electric shock hazards do exist. Experimental results show that the skin of the person who touches an exposed bi-pin may be burned due to such an electric shock. Fortunately, a mechanism of double shock prevention switches used in applications with the AC mains is also effective in applications with the ballasts to prevent the electric shock from occurring, thus protecting consumers from such a hazard, no matter whether input voltage is from the AC mains or the electronic ballast. Therefore, a universal LLT lamp that can work with either the AC mains or the electronic ballast makes sense. The effectiveness of using double shock prevention switches for applications in the AC mains has been well addressed in U.S. Pat. No. 8,147,091, issued on Apr. 3, 2012. However, a conventional shock prevention switch has an inherent issue related to an electric arc when operated with an electronic ballast. Unlike an AC voltage of 120 or 277 V/50-60 Hz from the AC mains, the output AC voltage and current from the electronic ballast presents a negative resistance characteristic. The feature that originally supports a fluorescent tube to function properly becomes extremely detrimental to the conventional shock prevention switch due to the electric arc likely occurring between two electrical contacts that have a high electric potential difference with a high frequency, such as 600 V/50 kHz. Once a consumer fails to follow installation instructions to install or uninstall linear LED tube lamps such that one of two ends of the tube lamp is in the fixture socket connected to a powered electronic ballast, and the other end is tweaked to connect to or disconnect from the associated socket, an internal arcing may occur between the electrical contacts in the associated switch. The arcing even in a short period such as several seconds can generate high heat, burning and melting electrical contacts and neighboring plastic enclosures, creating a fire hazard. The AC voltage of 120 or 277 V/50-60 Hz from the AC mains does not have such an issue because its voltage is relatively low compared with the ballast output voltage of 600 V. Moreover, the AC frequency of 60 Hz automatically extinguishes an arc every 1/60 seconds, if existed. That is why a utility switch can be used in an electrical appliance to turn power on and off without any problem. However, when used with the electronic ballast, the electrical contacts used in the conventional shock prevention switch can easily be burned out due to the high-voltage and high-frequency arcing introduced between each gap of each pair of the electrical contacts in the conventional shock prevention switch when someone tries to abusively tweak to remove the tube lamp from the fixture with the ballast that has a power on it. Although such a situation is rare, an internal arcing, if occurred, does cause burning and even welding of the electrical contacts and melting of the plastic enclosure, so called internal fire, creating consumer safety issues.

Today, such LLT lamps are mostly used in a ceiling light fixture with a wall-mount power switch. The ceiling light fixture could be an existing one used with fluorescent tubes but retrofitted for LLT lamps or a specific LLT lamp fixture. The drivers that provide a proper voltage and current to LED arrays could be internal or external ones. Not like LLT lamps with an external driver that is inherently electric-shock free if the driver can pass a dielectric withstand test used in the industry, LLT lamps with an internal driver could have a shock hazard during relamping or maintenance, when the substantial through-lamp electric shock current flows from any one of AC voltage inputs through the internal driver connecting to LED arrays to the earth ground. Despite this disadvantage, LLT lamps with the internal driver still receive wide acceptance because they provide a stand-alone functionality and an easy retrofit for an LLT lamp fixture. As consumerism develops, consumer product safety becomes extremely important. Any products with electric shock hazards and risk of injuries or deaths are absolutely not acceptable for consumers. However, commercially available LLT lamps with internal drivers, single-ended or double-ended, fail to provide effective solutions to the problems of possible electric shock and internal arcing and fire.

In the U.S. Pat. No. 9,826,595 issued on Nov. 21, 2017, a voltage across a current sensing resistor in an LED driving circuit of an LLT lamp is used to detect if an electric shock occurs. However, the scheme is LED driving circuit-dependent, meaning that an electric shock detection signal must come from the LED driving circuit to work, and thus causes inconvenience in applications. It is, therefore, the purpose of the present disclosure to propose a novel electronic approach that is not LED driving circuit-dependent, to be used in the LLT lamp to eliminate above-mentioned electric shock and internal fire hazards and to work more reliably to protect consumers.

SUMMARY

A linear light-emitting diode (LED)-based solid-state lamp comprising two lamp bases respectively connected to two ends of a housing, each lamp base comprising at least one electrical conductor connecting to a lamp fixture socket; a front-end electric shock detection and control module; an LED driving circuit; and LED arrays, is used to replace a fluorescent tube or a conventional LED tube lamp without the front-end electric shock detection and control module in an existing lamp fixture. The front-end electric shock detection and control module comprises at least one full-wave rectifier, at least one half-wave rectifier, a first set of voltage dividers and regulators, a second set of voltage dividers and regulators, a constant current sink, a switch control unit, and at least one switch. The at least one full-wave rectifier and the at least one half-wave rectifier are configured to respectively convert an input alternate current (AC) line voltage to a first direct current (DC) voltage and a second DC voltage. The first set of voltage dividers and regulators and the second set of voltage dividers and regulators are configured to convert the first DC voltage and the second DC voltage to a third DC voltage and a fourth DC voltage, respectively. The third DC voltage and the fourth DC voltage are coupled to form a mixed voltage in which a detection signal in substantially negative AC cycles is extracted and configured to provide timing information for the switch control unit to generate probing pulses.

Receiving the timing information, the switch control unit generates the probing pulses which are applied to the constant current sink. The constant current sink connected to the at least one half-wave rectifier receives the probing pulses and then sinks a constant current according to a pulse width of the probing pulses in certain substantially positive AC cycles. At the same time, the switch control unit checks the detection signal in a signal transition portion near the instant when each of the probing pulses is applied to the constant current sink. After checking the detection signal, the switch control unit either sends a control signal to override a control of the at least one switch and to turn off the at least one switch when the detection signal is identified as an electric shock signal or sends nothing to the at least one switch thereby maintaining the at least one switch in "on" state when the detection signal is not determined as an electric shock signal. When the detection signal is not determined as the electric shock signal, the switch control unit stops to generate the probing pulses in less than one second after the front-end electric shock detection and control module receives power from both the at least one full-wave rectifier and the at least one half-wave rectifier. When the detection signal is identified as the electric shock signal, the switch control unit continuously generates the probing pulses which are applied to the constant current sink for the front-end electric shock detection and control module to continuously monitor an input line voltage to see if the electric shock hazard disappears. A pulse repetition rate and the pulse width of the probing pulses are determined in a way that an average current consumed by the front-end electric shock detection and control module is less than 5 mA.

By sending the probing pulses to the constant current sink and checking the detection signal in response to the probing pulses, the front-end electric shock detection and control module detects and determines if the linear LED-based solid-state lamp is operated in a normal mode or in an electric shock hazard mode. When an installer touches an exposed at least one electrical conductor on a lamp base in an electric shock hazard mode, the front-end electric shock detection and control module detects and identifies such an electric shock hazard and shuts off a return current flow from the LED driving circuit to reach the at least one full-wave rectifier, thus eliminating an overall through-lamp electric shock current. The scheme can effectively prevent a through-lamp electric shock from occurring during relamping or maintenance. Because the front-end electric shock detection and control module is installed in front of the LED driving circuit and independently controls power delivered to the LED driving circuit without a need to receive a signal from the LED driving circuit to operate, any kinds of the LED driving circuit can be used in the linear LED-based solid-state lamp.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION OF THE INVENTION

Figure 1:
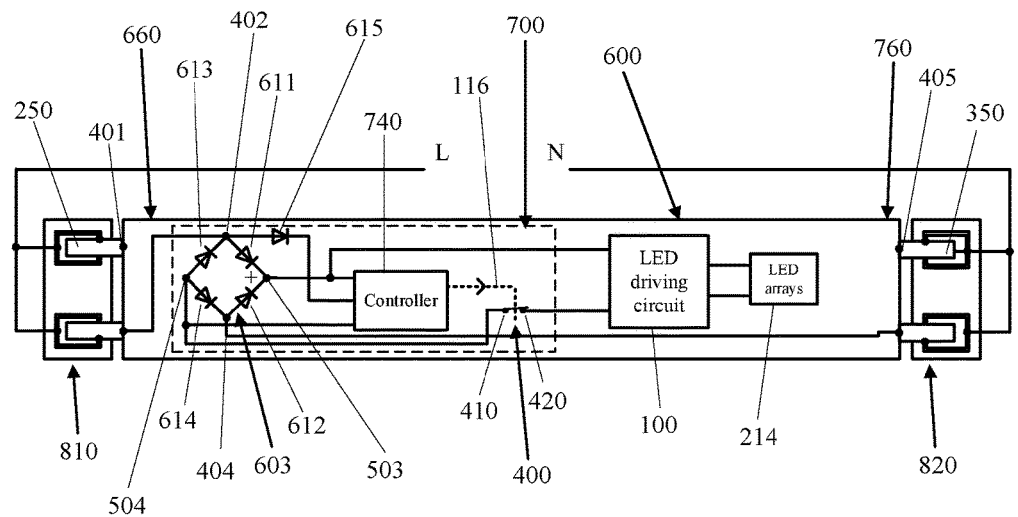
FIG. 1 is an embodiment of a linear light-emitting diode (LED)-based Tube (LLT) lamp installed in lamp fixture sockets connected to line voltages according to the present disclosure.

FIG. 1 is an embodiment of an LLT lamp installed in lamp fixture sockets connected to line voltages according to the present disclosure. The LLT lamp 600 comprises a housing having two ends, two lamp bases 660 and 760 each having at least one electrical conductor 250 and 350 at each end of the housing, a front-end electric shock detection and control module 700, an LED driving circuit 100 receiving power from the front-end electric shock detection and control module 700, and LED arrays 214 disposed between the two ends of the housing with the LED arrays 214 connected to the LED driving circuit 100. The front-end electric shock detection and control module 700 comprises at least one full-wave rectifier 603 comprising diodes 611, 612, 613, and 614 interconnected at ports 402, 404, 503, and 504 with DC+ and DC− at the ports 503 and 504, respectively; at least one half-wave rectifier 615 connected to the port 402; a controller 740; and a pair of electrical contacts 410 and 420 of at least one switch 400 controlled by the controller 740.

When the at least one electrical conductor 250 and the at least one electrical conductor 350 in each lamp base are respectively inserted into the lamp fixture sockets 810 and 820, an AC power from "L" and "N" via the ports 402 and 404 is inputted to front-end electric shock detection and control module 700. The at least one full-wave rectifier 603 and the at least one half-wave rectifier 615 convert an alternate current (AC) voltage into a direct current (DC) voltage to supply the front-end electric shock detection and control module 700. Since both the at least one electrical conductor 250 and the at least one electrical conductor 350 in respective lamp base are respectively inserted into the lamp fixture sockets 810 and 820, the front-end electric shock detection and control module 700 receives a normal line voltage, the controller 740 determines that no electric shock occurs and controls the at least one switch 400 to turn on through a control link 116 such that the electrical contacts 410 and 420 of the at least one switch 400 are electrically connected, allowing a normal driving current from the port 503 of the at least one full-wave rectifier 603 flowing into the LED driving circuit 100 to return to the port 504 of the at least one full-wave rectifier 603, thus completing a power transfer to the LED driving circuit 100 and further to the LED arrays 214.

When only one of the at least one electrical conductor 250 and the at least one electrical conductor 350 in each lamp base is inserted into the lamp fixture sockets 810 or 820 that is connected with "L" of the AC mains, the LLT lamp 600 does not light up but is live and energized, meaning that there is an electric shock hazard. If an installer touches the exposed at least one electrical conductor 250 or at least one electrical conductor 350 in each lamp base without the at least one switch 400 in place to control the current returned from the LED driving circuit 100, an electric shock current can flow from the LED arrays 214 through the LED driving circuit 100 to directly reach the at least one rectifier 603, further flowing to earth ground through the installer's body, creating an electric shock hazard. However, when such a situation occurs, the controller 740 determines that an electric shock occurs and controls the at least one switch 400 to turn off through a control link 116 such that the electrical contacts 410 and 420 of the at least one switch 400 are not electrically connected, disconnecting a driving current from the port 503 of the at least one full-wave rectifier 603 flowing into the LED driving circuit 100 to return to the port 504 of the at least one full-wave rectifier 603, thus blocking the electric shock current to flow through the installer's body.

Figure 2:
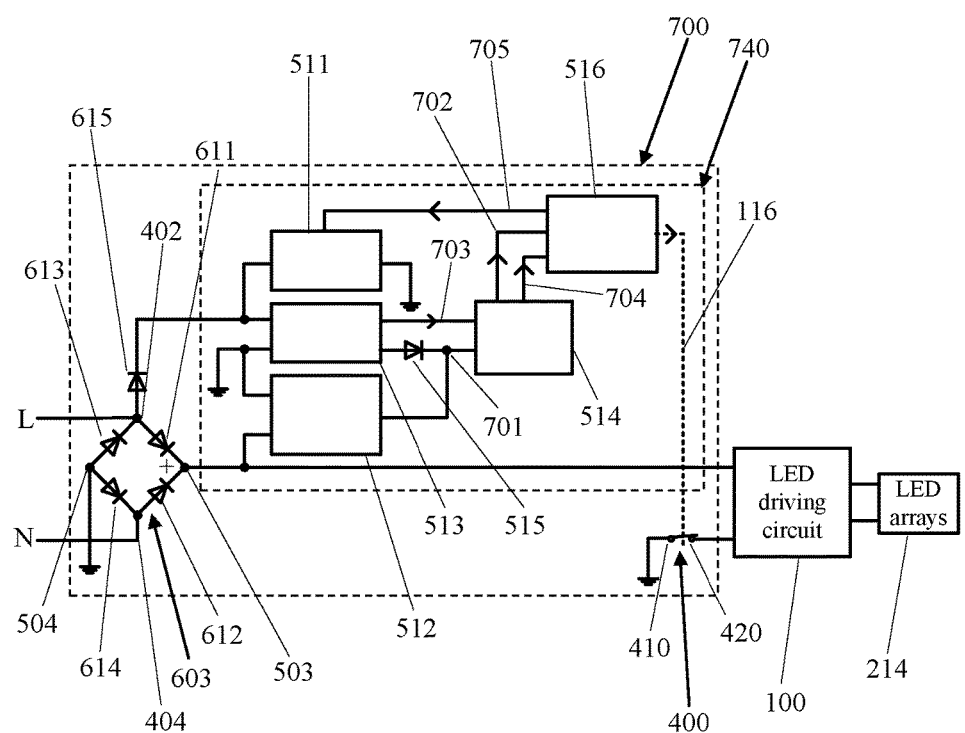
FIG. 2 is an embodiment of a front-end electric shock detection and control module connecting to an LED driving circuit and LED arrays according to the present disclosure.

FIG. 2 is an embodiment of a front-end electric shock detection and control module connecting to an LED driving circuit and LED arrays according to the present disclosure. As depicted in FIG. 1, the front-end electric shock detection and control module 700 comprises the at least one full-wave rectifier 603 comprising the diodes 611, 612, 613, and 614 interconnected at the ports 402, 404, 503, and 504 with DC+ and DC− at the ports 503 and 504, respectively; at least one half-wave rectifier 615; the controller 740; and the pair of electrical contacts 410 and 420 of the at least one switch 400 controlled by the controller 740. The controller 740 comprises a constant current sink 511, a first set of voltage dividers and regulators 512, a second set of voltage dividers and regulators 513, a signal extraction unit 514, a diode 515, and a switch control unit 516. The signal extraction unit 514 and the switch control unit 516 receive power from both the at least one full-wave rectifier 603 and the at least one half-wave rectifier 615 via a path 701 and a path 702.

The at least one full-wave rectifier 603 and the at least one half-wave rectifier 615 are configured to respectively convert an input alternate current (AC) line voltage to a first direct current (DC) voltage and a second DC voltage. The first voltage dividers and regulators 512 and the second voltage divider and regulator 513 are configured to convert the first DC voltage and the second DC voltage to a third DC voltage and a fourth DC voltage, respectively. The third DC voltage and the fourth DC voltage are coupled via the path 701 with the diode 514 as an interface. This forms a mixed voltage combining the third DC voltage and the fourth DC voltage. The mixed voltage is inputted to the signal extraction unit 514 to extract a detection signal that may contain an electric shock signal or a normal signal in substantially negative AC cycles. For the signal extraction unit 514 to operate and to extract the detection signal, an additional signal voltage via a path 703 may also be inputted to the signal extraction unit 514. The detection signal extracted from the signal extraction unit 514 is sent to the switch control unit 516 to determine if the electric shock occurs. In addition, the detection signal extracted also provides timing information for the switch control unit 516 to generate probing pulses to apply to the constant current sink 511.

Receiving timing information from the signal extraction unit 514 via a signal path 704, the switch control unit 516 generates the probing pulses which are applied to the constant current sink 511. The constant current sink 511, connected to the at least one half-wave rectifier 615, receives the probing pulses via a signal path 705 and then sinks a constant current according to a pulse width of each of the probing pulses in certain substantially positive AC cycles. At the same time, the switch control unit 516 checks the detection signal extracted in a signal transition portion near the instant when each of the probing pulses is applied to the constant current sink 511. The detection signal extracted near the instant comprises a detection signal of interest. After checking the detection signal, the switch control unit 516 either sends a control signal to override a control of the at least one switch 400 and to turn off the at least one switch when the detection signal of interest is identified as an electric shock signal or sends nothing to the at least one switch 400 thereby maintaining the at least one switch in "on" state when the detection signal of interest is not determined as an electric shock signal. When the detection signal of interest is not determined as the electric shock signal, the switch control unit 516 stops to generate the probing pulses in less than one second after the front-end electric shock detection and control module 700 receives power from both the at least one full-wave rectifier 603 and the at least one half-wave rectifier 615. When the detection signal of interest is identified as the electric shock signal, the switch control unit 516 continuously generates and sends the probing pulses to the constant current sink 511 and checks the detection signal of interest to see if the electric shock hazard still exists. A pulse repetition rate and the pulse width of the probing pulses are determined in a way that an average current consumed by the front-end electric shock detection and control module 700 is less than 5 mA.

By sending the probing pulses to the constant current sink 511 and checking the detection signal in response to the probing pulses, the front-end electric shock detection and control module 700 detects and determines if the linear LED-based solid-state lamp 600 is operated in a normal mode or in an electric shock hazard mode. When an electric shock hazard is identified, the at least one switch 400 shuts off a return current flow from the LED arrays 214 to reach the at least one full-wave rectifier 603, thus eliminating an overall through-lamp electric shock current to flow from the switch contacts 410 and 420 of the at least one switch 400 to the diode 614 of the at least one full-wave rectifier 603, further through a human's body down to "N" of the AC mains. The scheme can effectively prevent a through-lamp electric shock from occurring during relamping or maintenance. Because the front-end electric shock detection and control module 700 is installed in front of the LED driving circuit 100 and independently controls power delivered to the LED driving circuit 100 without a need to receive a signal from the LED driving circuit 100 to operate, any kinds of the LED driving circuit 100 can be used in such a linear LED-based solid-state lamp.

Figure 3:
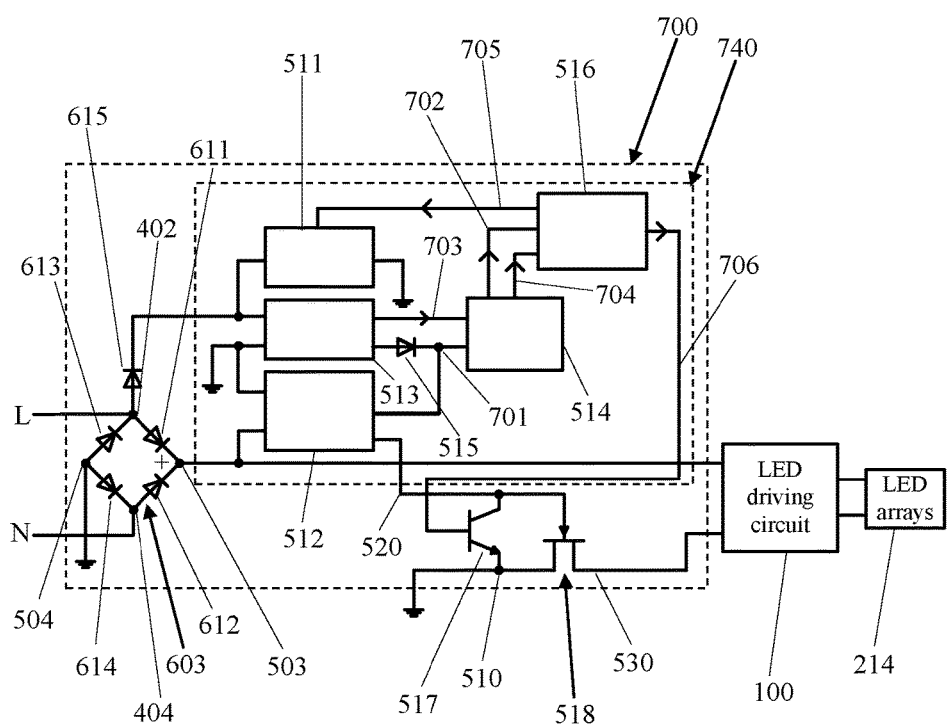
FIG. 3 is another embodiment of a front-end electric shock detection and control module connecting to an LED driving circuit and LED arrays according to the present disclosure.

FIG. 3 is another embodiment of a front-end electric shock detection and control module connecting to an LED driving circuit and LED arrays according to the present disclosure. FIG. 3 is similar to FIG. 2 except that the at least one switch 400 in FIG. 2 is replaced by a transistor 517 and a metal-oxide-semiconductor field-effect transistor (MOSFET) 518. The emitter and the collector of the transistor 517 are respectively connected to the source and the gate of the MOSFET 518 at a port 510 and a port 520. The base of the transistor 517 is connected to the switch control unit 516 via a path 706. In such a configuration, the switch control unit 516 can send a bias voltage to control the transistor 517 to conduct. When the transistor 517 conducts, the collector voltage drops to zero, which turns off the MOSFET 518. When the at least one full-wave rectifier 603 and the at least one half-wave rectifier 615 receive power from "L" and "N" of the AC mains, a DC voltage from the first set of voltage dividers and regulators 512 is also sent to the gate of the MOSFET 518. The DC voltage can turn on the MOSFET 518. However, if the transistor 517 conducts due to the bias voltage sent by the switch control unit 516, the MOSFET 518 can be immediately turned off. When the transistor 517 does not conduct, the collector voltage remains a level of the DC voltage, thus turning on the MOSFET 518. The drain 530 of the MOSFET 518 is connected to the LED driving circuit 100. Therefore, the MOSFET 518 can conduct or disconnect a current flow from the LED driving circuit 100. In this case, the port 510 and the drain 530 form a pair of switch contacts of the MOSFET 518 used as an electronic switch.

The electrical contacts 410 and 420 in FIGS. 1 and 2 and the electrical contacts 510 and 530 in FIG. 3 of the at least one switch may be an electrical, an electronic, an electro-mechanical, or a mechanical switch such as one in a solid-state relay, an electronic relay, an electro-mechanical relay, a pair of mechanical contacts, or other bidirectional and unidirectional current control devices such as a triac, a back-to-back thyristor, a silicon-controlled rectifier (SCR), a transistor, a metal-oxide-semiconductor field-effect transistor (MOSFET), or various combinations thereof. Also such devices may be connected with some snubber circuits to maintain their functionality under voltage spikes. Although the LED arrays are consistently used in FIGS. 1-3, the LED arrays may mean one or more LED arrays.

Figure 4:
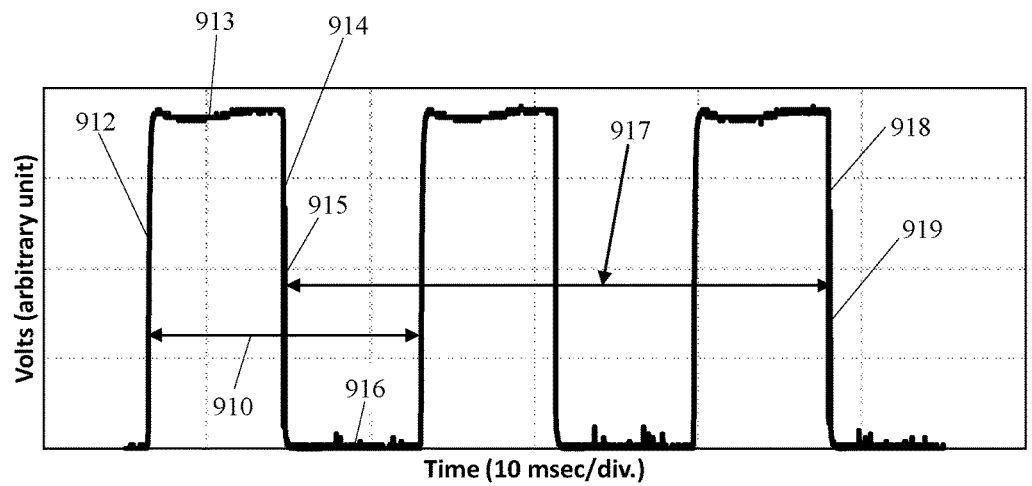
FIG. 4 is a detection signal waveform extracted from the signal extraction unit according to the present disclosure.
Figure 4:
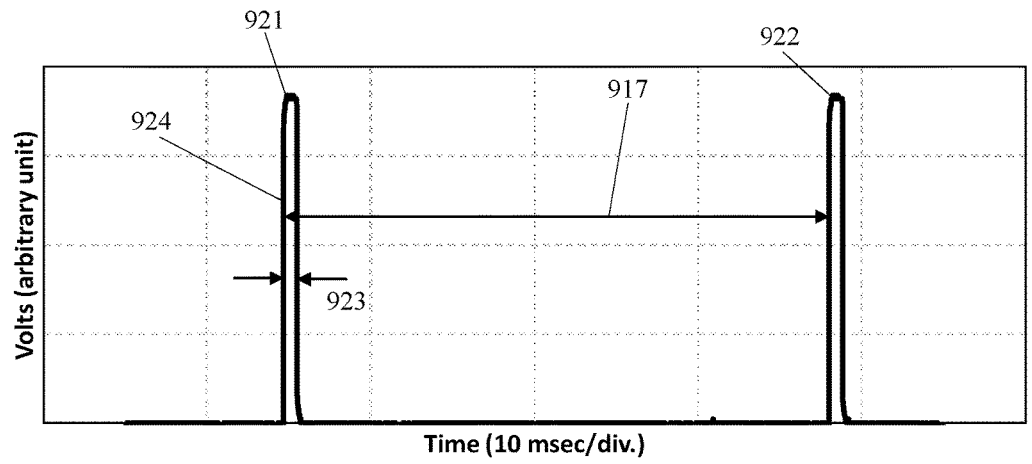

FIG. 4 is a detection signal waveform extracted from the signal extraction unit 514 according to the present disclosure. As mentioned earlier, the mixed voltage combining the third DC voltage and the fourth DC voltage is inputted to the signal extraction unit 514 to extract a detection signal that may contain an electric shock signal or a normal signal in substantially negative AC cycles. FIG. 4 shows a waveform of the detection signal extracted from the signal extraction unit 514 and two probing pulses 921 and 922 generated by the switch control unit 516. In FIG. 4 (a), the detection signal waveform extracted has a square-wave like shape. In a period 910, the square-wave like shape comprises five portions: a rising edge 912, a top portion 913, a falling edge 914, a signal transition portion 915, and a zero-volt portion 916. In the third period shown in FIG. 4 (a), there are another falling edge 918 and another signal transition portion 919. The waveform in the top portion 913 basically follows the mixed voltage in substantially negative AC cycles whereas the waveform goes to zero volts in zero-volt portion 916 in substantially positive AC cycles. The period 910 is 16.667 milliseconds (ms), a reciprocal of 60 Hz. The falling edge 914 and the signal transition portion 915 come between the top portion 913 and the zero-volt portion 916. In FIG. 4 (b), the two probing pulses 921 and 922 respectively synchronized with the falling edge 914 and another falling edge 918 are generated by the switch control unit 516 with a pulse width 923 of 0.8 ms and a pulse repetition rate 917 of 33.333 ms (a reciprocal of 30 Hz). In other words, the falling edge 914 and the falling edge 918 provide timing information for the switch control unit 516 to generate the two probing pulses 921 and 922, which are then applied to the constant current sink 511 (in FIGS. 2 and 3) to sink a constant current according to the pulse width 923 of the two probing pulses 921 and 922. In FIG. 4 (b), the probing pulse 921 has a leading edge 924 exactly coincident with the falling edge 914. In response to the constant current sinking, the detection signal extracted near the signal transition portions 915 and 919 reflects a change.

Figure 5:
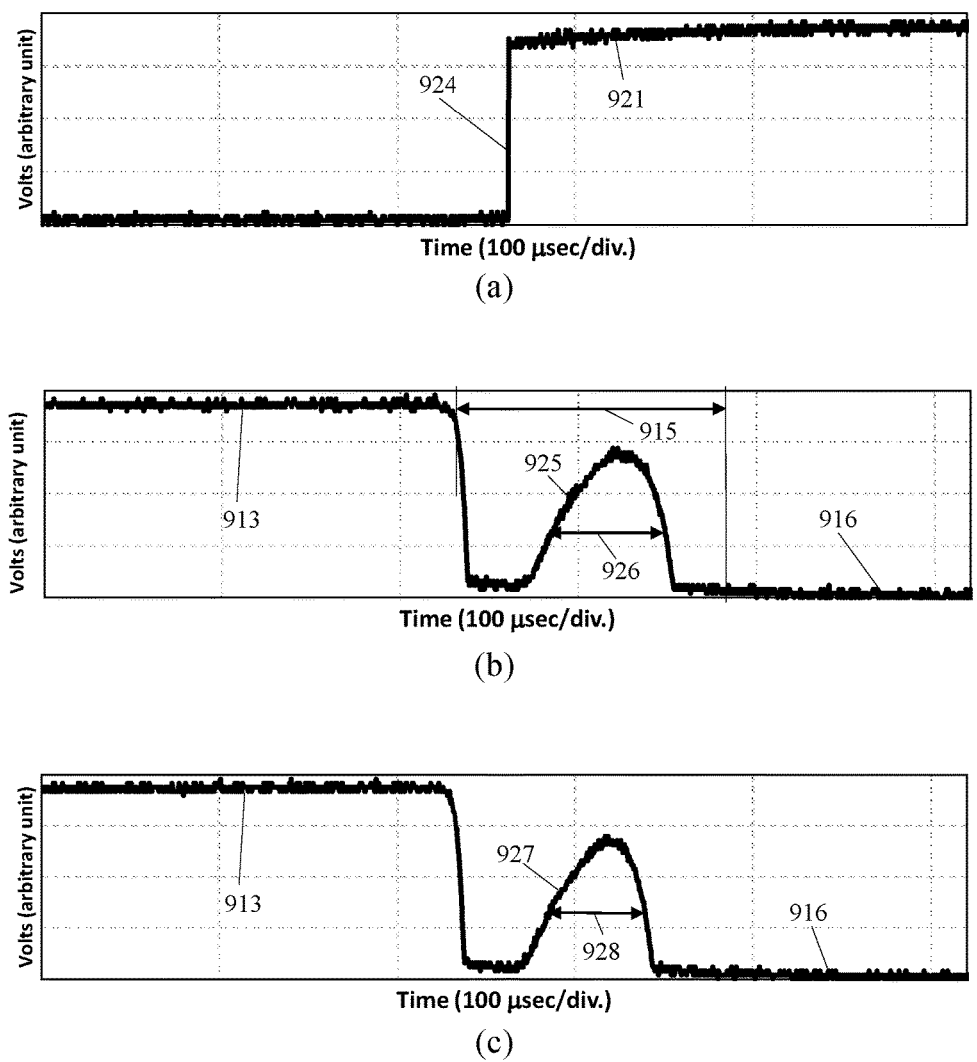
FIG. 5 is a detection signal waveform when an electric shock is detected in an electric shock hazard mode, compared with one when the LLT lamp is operated in a normal mode according to the present disclosure.

FIG. 5 is a detection signal waveform extracted from the signal extraction unit when an electric shock is detected in an electric shock hazard mode, compared with one when an electric shock is not detected in a normal mode according to the present disclosure. FIG. 5 is a magnified view of FIG. 4 (a) focusing on the signal transition portion 915 in FIG. 4 (a) with a time scale of 100 μsec/div. In FIG. 5 (a), the probing pulse 921, like in FIG. 4, has the leading edge 924. FIG. 5 (b) is the detection signal waveform extracted from the signal extraction unit 514 when an electric shock is detected in an electric shock hazard mode. In FIG. 5 (b), when the probing pulse 921 is applied to the constant current sink 511 (in FIGS. 2 and 3) to sink a constant current, the detection signal extracted near the signal transition portions 915 shows a responding pulse 925 with a full width at half maximum (FWHM) 926 before reaching the zero-volt portion 916. FIG. 5 (c) is the detection signal waveform extracted from the signal extraction unit 514 when the electric shock does not occur in the normal mode. In FIG. 5 (c), when the probing pulse 921 is applied to the constant current sink 511 to sink a constant current, the detection signal extracted near the signal transition portions 915 shows a responding pulse 927 with an FWHM 928 before reaching the zero-volt portion 916. In comparison with the FWHMs of 926 and 928, it shows that the FWHM 926 is 20% greater than the FWHM 928, sufficiently large enough for the switch control unit 516 to determine whether the electric shock occurs or not. In other words, the detection signal in the signal transition portion comprises a responding pulse with an FWHM, which can be used to determine whether the electric shock occurs.

Although the FWHM of the responding pulse is used here as an example to determine whether the electric shock occurs, an amplitude of the responding pulse can also be used to do the same. Although only one line voltage is used in FIGS. 4 and 5 for a demonstration purpose, any AC voltages from 110 to 277 V/50-60 Hz from the AC mains can do the work. Although the front-end electric shock detection and control module 700 in FIGS. 1-3 comprises at least one full-wave rectifier to supply power to the LED driving circuit 100, the LED driving circuit 100 may comprise additional full-wave rectifiers.

Whereas preferred embodiments of the present disclosure have been shown and described, it will be realized that alterations, modifications, and improvements may be made thereto without departing from the scope of the following claims. Another kind of the through-lamp electric shock prevention schemes in an LED-based lamp using various kinds of combinations to accomplish the same or different objectives could be easily adapted for use from the present disclosure. Accordingly, the foregoing descriptions and attached drawings are by way of example only, and are not intended to be limiting.

What is claimed is:

1. A linear light-emitting diode (LED) tube lamp, comprising:
   a housing having two ends;
   one or more LED arrays disposed between the two ends of the housing;
   two lamp bases respectively connected to the two ends of the housing, each lamp base comprising at least one electrical conductor configured to insert into a respective lamp fixture socket;
   a front-end electric shock detection and control module comprising at least one full-wave rectifier, at least one half-wave rectifier, a first set of voltage dividers and regulators, a second set of voltage dividers and regulators, a constant current sink connected to the at least one half-wave rectifier, a signal extraction unit controlled by the second set of voltage dividers and regulators, a switch control unit connected to the signal extraction unit, and at least one switch, wherein the at least one full-wave rectifier and the at least one half-wave rectifier are configured to respectively convert an input alternate current (AC) line voltage to a first direct current (DC) voltage and a second DC voltage, and wherein the first set of voltage dividers and regulators and the second set of voltage dividers and regulators are respectively configured to convert the first DC voltage and the second DC voltage to a third DC voltage and a fourth DC voltage, respectively; and an LED driving circuit configured to receive the first DC voltage via the at least one switch and to drive and to light up the one or more LED arrays;

wherein:

the switch control unit is capable of independently detecting, based on the third DC voltage and the fourth DC voltage, whether an electric shock occurred at the at least one electrical conductor without receiving any signal from the LED driving circuit;

responsive to a detection of the electric shock by the switch control unit, the at least one switch disables an electric current flow from the LED driving circuit, thereby disconnecting an electric current return from the one or more LED arrays to reach the at least one full-wave rectifier; and when the at least one electrical conductor in each lamp base is inserted into the respective lamp fixture socket, the front-end electric shock detection and control module enables the LED driving circuit to deliver electrical power to the one or more LED arrays.

2. The linear LED tube lamp of claim 1, wherein the front-end electric shock detection and control module is configured to receive power from both the at least one full-wave rectifier and the at least one half-wave rectifier.

3. The linear LED tube lamp of claim 1, wherein the third DC voltage and the fourth DC voltage are coupled via a diode to form a mixed voltage in which a detection signal in substantially negative AC cycles is extracted by the signal extraction unit to provide timing information for the switch control unit to generate probing pulses.

4. The linear LED tube lamp of claim 3, wherein the diode conducts electrically when an input line voltage is greater than 277 VAC.

5. The linear LED tube lamp of claim 3, wherein the constant current sink receives the probing pulses from the switch control unit and sinks a constant current according to a pulse width of the probing pulses in certain substantially positive AC cycles.

6. The linear LED tube lamp of claim 5, wherein a pulse repetition rate and the pulse width of each of the probing pulses are determined in a way that an average current consumed by the front-end electric shock detection and control module is less than 5 mA.

7. The linear LED tube lamp of claim 3, wherein the detection signal comprises a signal transition portion during which the detection signal swings at least one time from a high level to eventually zero volts near the instant when each of the probing pulses is applied to the constant current sink.

8. The linear LED tube lamp of claim 7, wherein the detection signal in the signal transition portion comprises a responding pulse with a full width at half maximum (FWHM), which is used by the switch control unit to determine whether the electric shock occurs.

9. The linear LED tube lamp of claim 7, wherein the detection signal in the signal transition portion comprises a responding pulse with an amplitude, which is used by the switch control unit to determine whether the electric shock occurs.

10. The linear LED tube lamp of claim 7, wherein the switch control unit either sends a control signal to override a control of the at least one switch and to turn off the at least one switch when the detection signal is identified as an electric shock signal or sends nothing to the at least one switch to maintain the at least one switch in "on" state when the detection signal is not determined as an electric shock signal.

11. The linear LED tube lamp of claim 10, wherein when the detection signal is not determined as the electric shock signal, the switch control unit generates the probing pulses in less than one second after the front-end electric shock detection and control module receives power from both the at least one full-wave rectifier and the at least one half-wave rectifier.

12. The linear LED tube lamp of claim 10, wherein when the detection signal is identified as the electric shock signal, the switch control unit continuously generates the probing pulses and applies to the constant current sink.

13. The linear LED tube lamp of claim 1, wherein the at least one switch comprises electrical contacts comprising electrical terminals of at least one relay.

14. The linear LED tube lamp of claim 13, wherein the at least one relay comprises a solid-state relay, an electronic relay, or an electro-mechanical relay.

15. The linear LED tube lamp of claim 1, wherein the at least one switch comprises electrical contacts comprising electrical terminals of at least one triac.

16. The linear LED tube lamp of claim 1, wherein the at least one switch comprises electrical contacts comprising electrical terminals of at least one electronic switch.

17. The linear LED tube lamp of claim 16, wherein the at least one electronic switch comprises a metal-oxide-semiconductor field-effect transistor (MOSFET), a field-effect transistor (FET), a transistor, a back-to-back thyristor, a silicon-controlled rectifier (SCR), or a combination thereof.

18. The linear LED tube lamp of claim 17, wherein the switch control unit sends a control voltage to override a control of the at least one electronic switch.

* * * * *